June 22, 1937.　　　　L. B. CORNWELL　　　　2,084,945
LOUDSPEAKER
Filed Dec. 5, 1935　　　　7 Sheets-Sheet 1
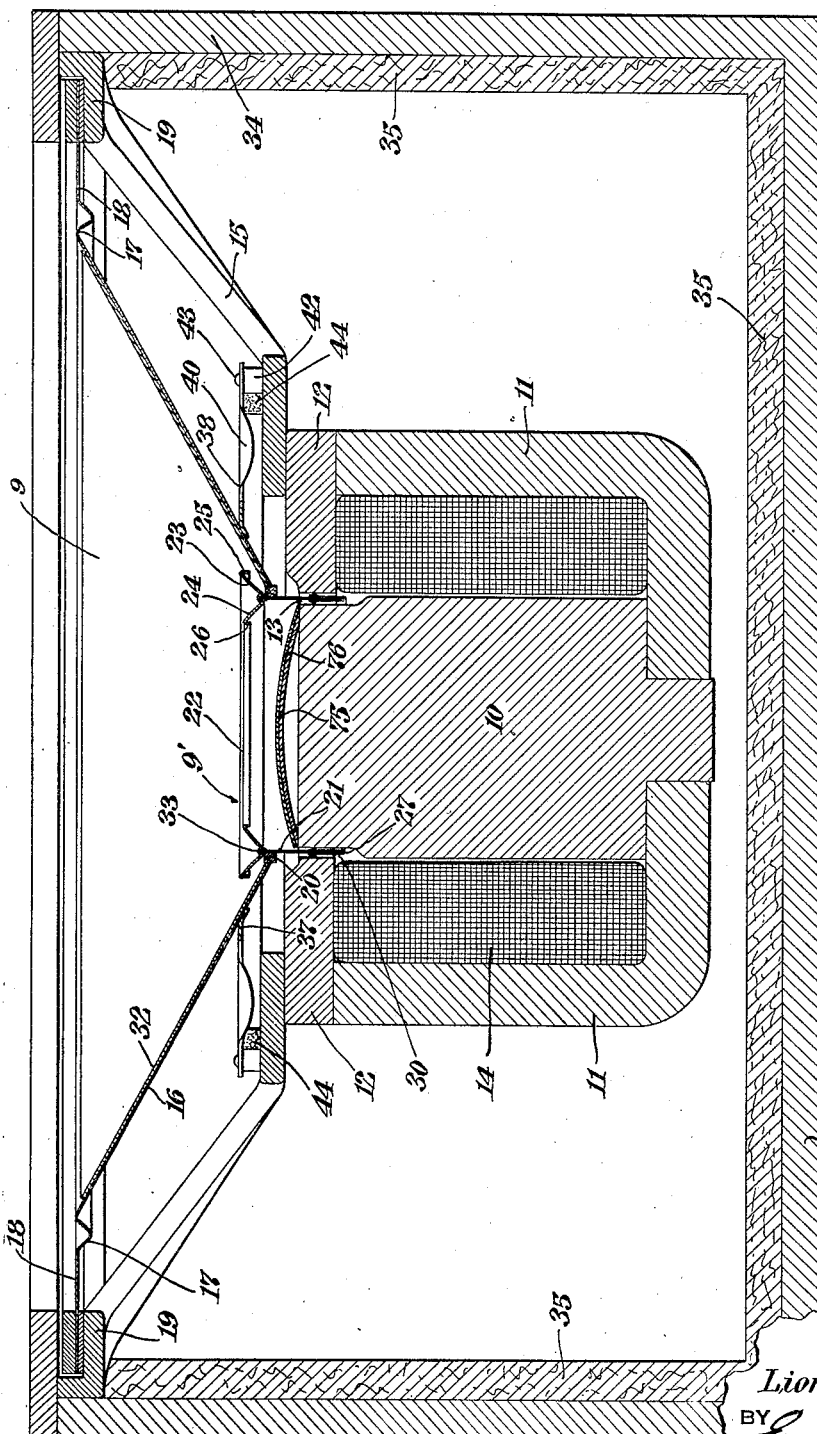
Fig. 1.
INVENTOR
Lionel B. Cornwell
BY
ATTORNEYS June 22, 1937.  L. B. CORNWELL  2,084,945
LOUDSPEAKER
Filed Dec. 5, 1935   7 Sheets-Sheet 2
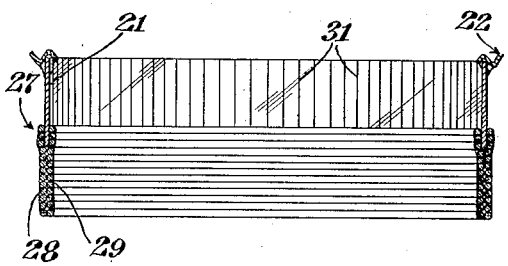
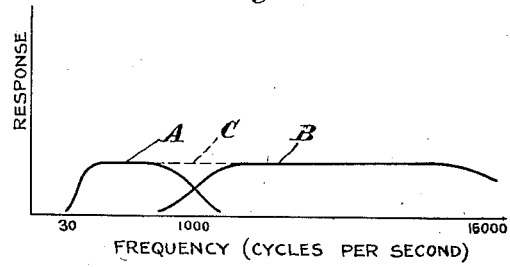
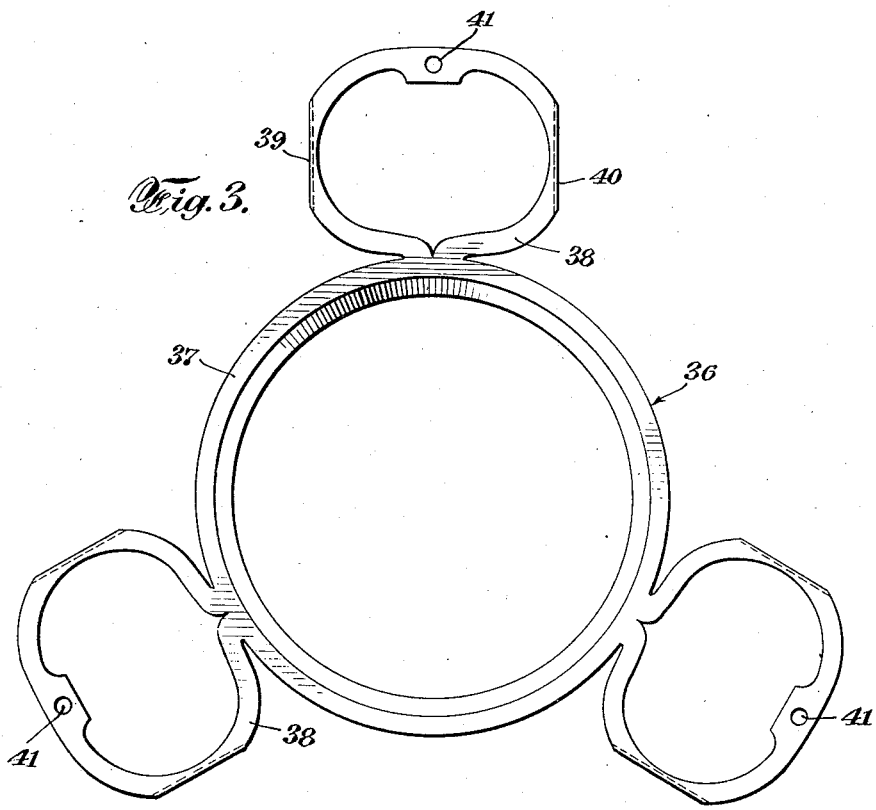
INVENTOR
Lionel B. Cornwell
BY
Edwards Bruer & ?
ATTORNEYS

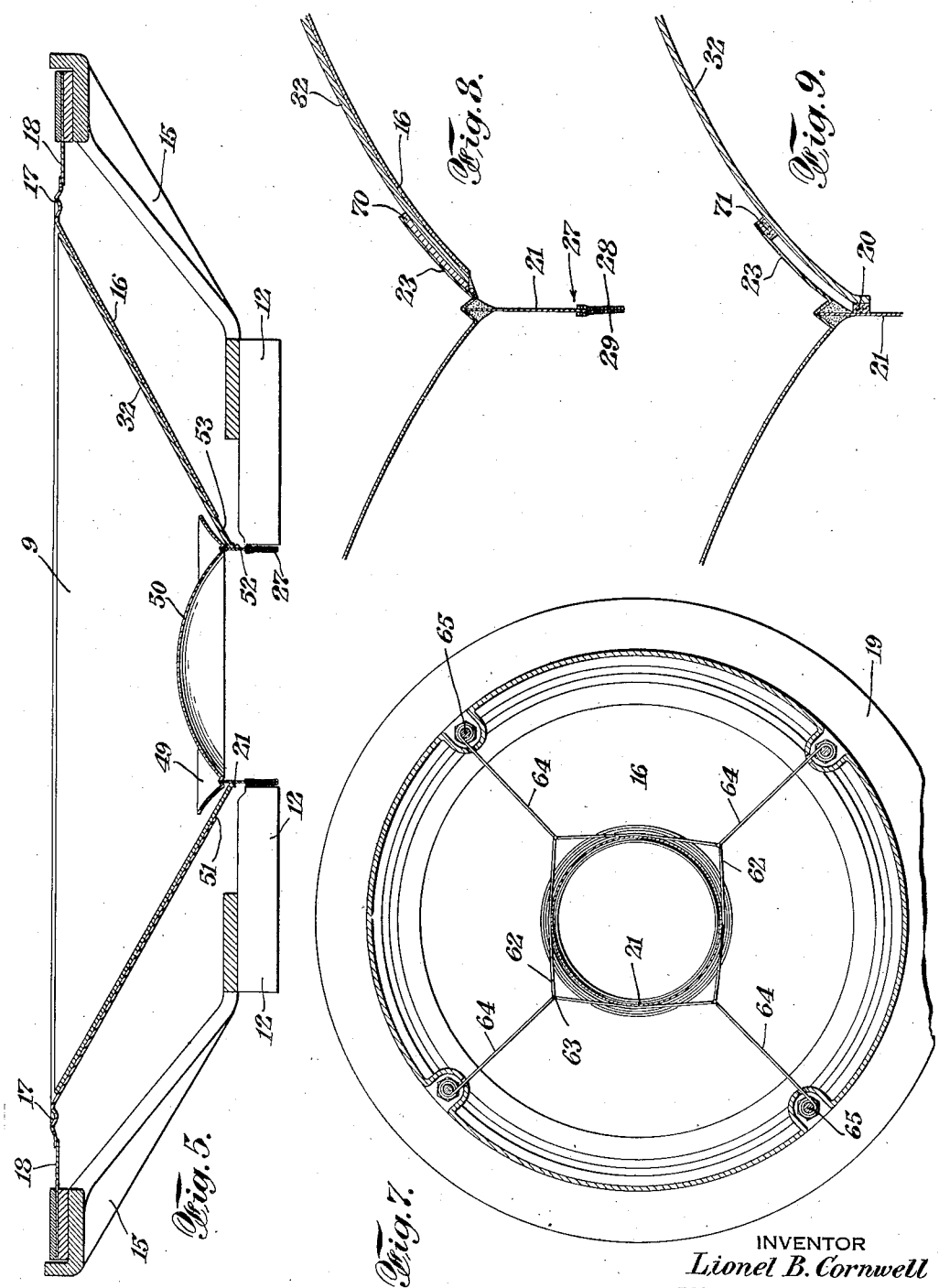

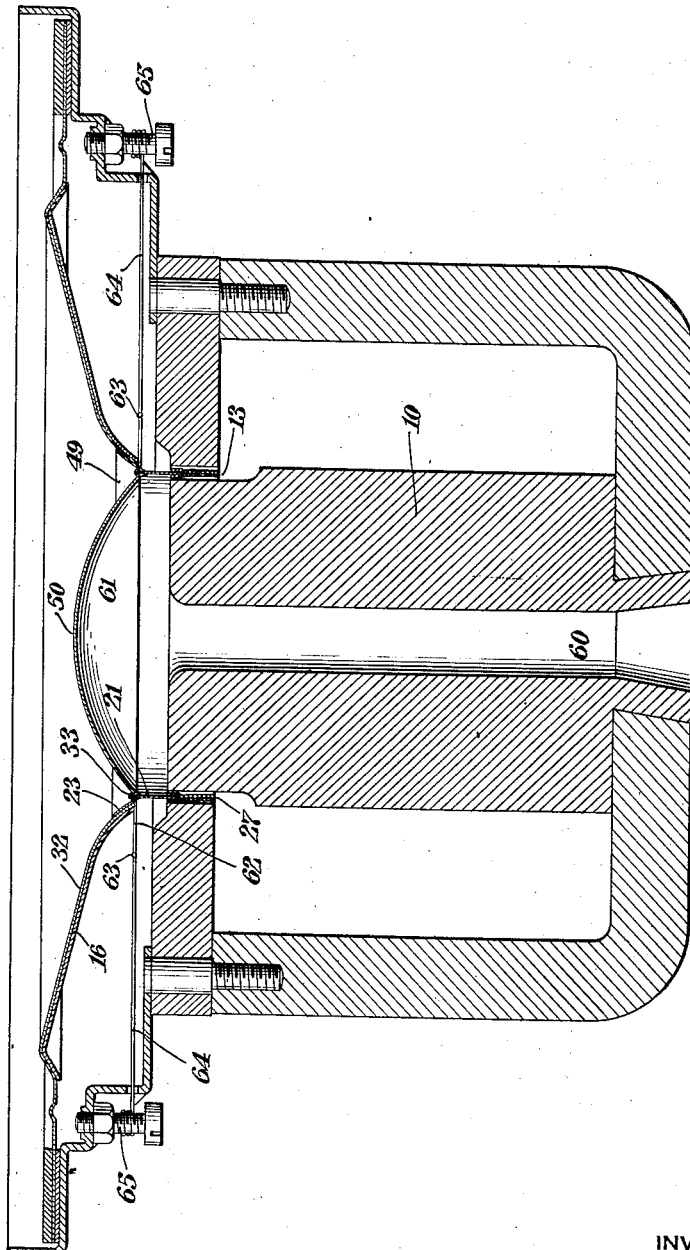

June 22, 1937. L. B. CORNWELL 2,084,945
LOUDSPEAKER
Filed Dec. 5, 1935 7 Sheets-Sheet 5

INVENTOR
Lionel B. Cornwell
BY Edwards, Bruer & Pool
ATTORNEYS

June 22, 1937.  L. B. CORNWELL  2,084,945
LOUDSPEAKER
Filed Dec. 5, 1935   7 Sheets-Sheet 7

INVENTOR
Lionel B. Cornwell
BY
ATTORNEYS

Patented June 22, 1937

2,084,945

UNITED STATES PATENT OFFICE 2,084,945

LOUDSPEAKER

Lionel B. Cornwell, Teaneck, N. J.

Application December 5, 1935, Serial No. 53,018

20 Claims. (Cl. 179—115.5)

This invention relates to electro-acoustical reproducers, and more particularly to loud speakers.

The principal object of this invention is to provide a loud speaker which can be made uniformly responsive over a wide frequency range and which is characterized by a high degree of fidelity and efficiency.

Related objects are to prevent the production of tones or relative changes in amplitude thereof which are non-existent at the original sound source, and to prevent change of the response characteristic when different frequencies are superimposed.

Loud speakers heretofore available are generally subject to the disadvantage of more or less unfaithful response to the component frequencies of an original source of sound being reproduced. The distorted response has sometimes taken the form of over or under emphasis of portions of the total audible range, and sometimes has manifested itself by the creation or omission or changed emphasis of overtones at spaced intervals in the frequency range. Attempts to overcome these defects have involved compensation by a complementary distortion in other circuits of a reproducing system, or the use of a plurality of loud speakers to "average out" the defects of individual speakers, but these efforts at compensation and averaging out add their own complications, increase the cost of the apparatus and have been unsatisfactory in the results attained.

The above noted defects of prior loud speakers are overcome in the system of this invention by providing a loud speaker having response characteristics which closely approach the ideal uniform response, and which can be accurately predetermined. Consequently, compensation for defective response is unnecessary.

The invention is carried out by the provision of a vibratory emitting device comprising two elements of predetermined characteristics with a "compliance" member joining the elements so as to bring them into desired cooperation.

One of these emitting or diaphragm elements is a light, very rigid vibratory element of relatively small area in one substantially incompressible unit with a light, rigid and extremely incompressible actuating member. The combination of the actuating member and small diaphragm element constitutes a unit which is adapted to respond to a wide range of the higher audible frequencies, from the order of about 1,000 cycles per second or below to as high as 16,000 cycles to 20,000 cycles per second.

The second of the two diaphragm elements is a heavier, less rigid element of relatively large area joined to the first mentioned smaller diaphragm element or to the actuating member through the compliance member. According to a feature of the invention the compliance member is so selected and proportioned as to transmit to the second diaphragm element the lower audible frequencies up to approximately the frequencies at which the first element starts to respond. But the compliance member is preferably so resilient as not to transmit vibrations in the higher frequency range.

According to a feature of the invention, the large diaphragm element and the compliance member attaching it are so formed and positioned with relation to the vibration actuating member that while each is vibratory within its predetermined range the two ranges are overlapped in definite desired manner. Such relationship permits proportioning of the diaphragm elements and compliance member to create a substantially uniform overall response. By suitable modification, desired variations of frequency response may be introduced.

According to a preferred embodiment, the loud speaker is of the dynamic type in which the smaller diaphragm element is a light rigid annulus or ring; the actuating member is a light incompressible cylinder, preferably mica, supporting an actuating coil and rigidly fastened to the smaller diaphragm element; and the larger diaphragm element is a relatively heavy flexible cone of a material such as paper attached to the coil support or the annulus through a compliance ring of a material such as felt.

A feature of the invention resides in the construction of an actuating coil and its support and its attachment to the small diaphragm element.

Another feature resides in means for centering the actuating element within an air gap containing a magnetic field.

The above and other features will be better understood from the following detailed description of specific embodiments when considered with the accompanying drawings, of which:

Fig. 1 illustrates in section a loud speaker of the moving coil type having a vibratory actuating member and a diaphragm constructed according to this invention;

Fig. 2 shows a current carrying coil and support adapted for use in the loud speaker according to this invention;

Fig. 3 shows an enlarged view of the arrangement used in the loud speaker of Fig. 1 for centering the diaphragm in position;

Fig. 4 shows graphically typical response characteristics of the loud speaker of Fig. 1;

Fig. 5 illustrates a modified form of diaphragm device;

Fig. 6 shows another loud speaker structure embodying the invention;

Fig. 7 is an enlarged plan view of the arrangement used for centering the diaphragm as shown in Fig. 6;

Figs. 8 and 9 are enlarged views of modified diaphragm details;

Figure 10:
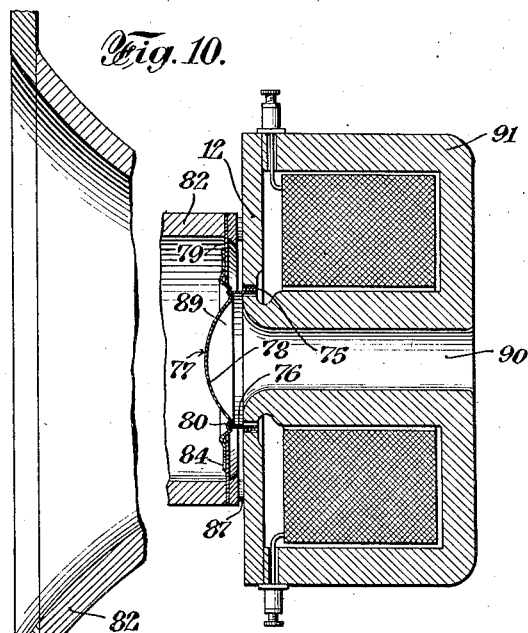
Fig. 10 is a longitudinal sectional view of a modification.
Figure 11:
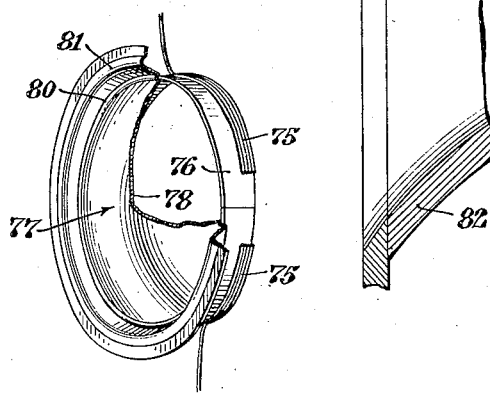
Fig. 11 is a perspective view of a portion of the apparatus shown in Fig. 10.

Fig. 1 illustrates an electro-dynamic loud speaker comprising a cylindrical magnetic core or pole piece 10 centrally mounted in a cup yoke 11, to the circular end of which is fastened a flat annular pole piece 12. An annular air gap 13 is formed between the pole pieces 10 and 12. A coil 14 is wound around the pole piece 10 within the yoke 11 through which is sent a direct current for creating a unidirectional magnetic field through the pole pieces and air gap 13.

Attached to the pole piece 12 is a supporting spider having spokes 15 which flare conically outward from in front of the pole piece. The spider also supports an outer low frequency diaphragm element 9 comprising a conical member 16 preferably of soft fibrous paper which is mounted coaxially with reference to the magnetic pole piece. To obtain an outer support the outer rim of the cone is provided with an annular corrugated portion 17 terminating in a heavy flat ring portion 18 which is fastened to the outer ring 19 of the spider as shown.

The outer surface of the cone has cemented thereto a reinforcing layer 32 of a suitable material such as a soft fabric, preferably a rubberized soft cotton cloth of a character similar to chamois skin. The presence of this fabric serves to load the paper cone and to damp its surface vibrations.

The inner circular edge of the cone is cemented in a "compliance" ring 20 of a suitable soft yielding material, preferably felt, which in turn is cemented to the thin mica cylinder 21 of the inner high frequency plunger element 9'. The mica cylinder 21 is of the proper diameter and length to extend concentrically into the air gap 13 and at its outer circular edge there is cemented a smaller diaphragm in the form of an extremely light and rigid annular member 22 having a cross section in the shape of a W with outwardly flaring sides, or wings, 23 and 24. The inverted V 33 forming the central portion of the W is made relatively small to receive the edge of the mica cylinder 21 which is then rigidly cemented in place by filling in the V with cement. The outer rims of the flaring wings 23 and 24 of the W are bent down to form flanges 25 and 26, respectively, for the purpose of adding rigidity. This W-shaped member is preferably stamped from a single piece of a light aluminum alloy, such as Duralumin, about .002 inch thick, though other materials may be employed, to give the necessary lightness and stiffness.

The cylinder 21, shown enlarged in Fig. 2, acts as a "voice" coil support. It is made from a narrow continuous strip of mica having a thickness of the order of .002 inch and having numerous cracks 31 parallel to the axis of the cylinder at short intervals around the circumference for the purpose of rendering the strip sufficiently flexible to be rolled into a substantially perfect cylinder which is, nevertheless, substantially incompressible in the direction of the axis. A current carrying coil 27 is supported at the end of the cylinder opposite that to which the annulus 22 is attached. This coil is composed of two layers 28 and 29 which may total about 50 turns of No. 36 B. & S. gauge enameled copper or aluminum wire. The cylinder may be inserted only between the last two or three turns of the two layers as shown. The entire coil assembly, as thus formed, with its enameled wire is saturated by a suitable binder such as hard shellac so that upon drying of the binder there results an extremely light and rigid coil and support encasing the coated wires in a solid hardened mass. The entire unit consisting of the coil, the support and the annulus 22 rigidly cemented to the support, constitutes an extremely light, rigid and substantially incompressible unit which is thereby enabled to vibrate at extremely high frequencies.

It has been found that in a magnetic circuit of the type shown, the field intensity which exists in the air gap at region 30 slightly inside the inner edge of the pole piece 12, is of practically the same value as that directly between the adjacent surfaces of the pole pieces. Consequently, it has been found possible, and even preferable, to extend coil 27 a substantial distance below the gap of the opposed pole piece faces, as shown in Fig. 1, to take advantage of the magnetic field in this region 30. By this extension the electro-acoustical efficiency of the loud speaker is brought to a high value.

The cone and voice coil support are centered by a centering device 36, shown in enlarged detail in Fig. 3. This device is composed of a light metal and comprises a circular ring 37 having radially extending ears 38 of which the centers are cut out to obtain lightness and to provide flexibility in the axial direction. A portion of the periphery at 39 and 40 at each side of each ear is bent perpendicular to the plane of the ear for the purpose of limiting the bending to the area adjacent the ring 37. Holes 41 are provided at the outer periphery of each ear, by which the ears are fastened through bushings 42 by screws 43 to the inner portions of the spider webs. After the centering adjustment is made the screws 43 are tightened down. Blocks 44 of resilient material such as sponge rubber placed under the ears are frequently desirable to prevent excessive whipping, which if present, would introduce spurious vibrational sounds during operation.

To prevent the destructive circulation of air waves between the front and back of the speaker at low frequencies of the order of less than 1,000 cycles per second, and particularly of the order of 100 cycles per second and less, there is provided a substantially air-tight enclosure 34, preferably lined with a sound absorbent material 35, such as cotton batting. The cubical content within the enclosure 34 should preferably be of such a value as to provide a cavity resonance somewhat below the lowest frequency to which the loud speaker is responsive. By the use of this enclosure, the necessity for extensive and unwieldy baffles is obviated.

Since the inner wing 24 of the inner diaphragm element 22 does not extend completely across the front of the pole piece 10, a considerable portion of the upper face of the pole piece is exposed. There is formed a cavity bounded by the end surface of pole piece 10, the inner surface of cylinder 21 and the lower surface of wing 24, which cavity tends to be resonant at some particular frequency. Consequently, a considerable radiation would tend to be reflected from the pole piece surface. To prevent such radiation a dome-shaped cap 75, preferably lined with a sound absorbing substance such as felt 76, is provided on the face of the pole piece.

In operation of the loud speaker, a constant direct current is sent through coil 14 thereby creating a steady uni-directional magnetic field at air gap 13. The audible frequency currents corresponding to the original sound are impressed on the "voice" coil 27 thereby causing this coil and its rigid mica support 21 to vibrate parallel to the cylindrical axis at every frequency present in coil 27 and with proportionate amplitude. The coil 27 is maintained concentrically within the annular air gap 13 by the centering device 36 which readily yields to vibration in the axial direction of the coil support, but permits no movement in the radial direction.

Owing to the extreme lightness and rigidity of the coil, the coil support and the annulus 22, these members vibrate as a unit at high frequencies of 1,000 cycles and above. The area of the annulus is adequate for radiating such high frequencies, but is insufficient to support appreciable sound radiation at lower frequencies, below the order of about 1,000 cycles per second for example. At still higher frequencies, for example about 4,000 cycles per second and up to about 16,000 to 20,000 cycles per second, I find that the area in full vibration will decrease and only the inner portion of the annulus at and near the inverted V 33 is in vibration.

The ability of the speaker to radiate at such high frequencies is dependent on the coil vibrations reaching the annulus, or at least its inverted V. This requires that the coil support be extremely incompressible in its axial direction so that practically none of the amplitude of vibration is absorbed in the support. The sheet mica used for the support is best suited for the purpose, for it is a crystalline substance having an extremely high ratio of stiffness to its weight. Young's modulus of elasticity for this sheet mica is approximately $30 \times 10^{+6}$ lbs. per square inch and its specific gravity is only about 2.9. Hence the ratio of modulus of elasticity to specific gravity is as much as about $10 \times 10^{+6}$. This fact coupled with the fact that the mica can be prepared in a sheet as thin as .002 inch makes it adaptable for transmitting the vibrations from the coil to the annulus 22.

The cone 9 is not affected by the vibrations in the higher frequency range, for example above 1,000 cycles per second, because the compliance ring 20 is made too resilient to transmit such high frequencies from the coil support to the cone. In the lower frequency range, for example from about 1,000 cycles per second down to about 30 cycles per second, however, the compliance ring is sufficiently stiff to transmit the vibrations to the cone. Although the annulus 22 also vibrates at these lower frequencies it does not support much sound radiation because of its small area. The lower the frequency the greater is the vibrating area required; so the relatively large area of the cone 9 supports practically all of the low frequency radiation. Owing to the heavy damping effect of the fabric layer 32 flexural vibrations are effectively eliminated and the entire cone 9 operates with substantially pure plunger action.

The cone or diaphragm 9 may be formed of a single fibrous material paper or textile and according to my invention will generally have a front emitting surface rough or napped to be absorbent and non-reflective of relatively high frequency vibrations. The rear surface of the paper or cloth sheet forming the cone may be stiffened as by lacquering to give rigidity according to the low frequency characteristics desired.

A feature of fundamental importance in the diaphragm construction is the fact that the inner annular element 22 is separately vibrating. It is also generally of relatively small area, the outer wing 23 usually not extending outwardly more than about ⅜ inch. A larger area for this element results in an overall response curve which is over-accentuated in an intermediate region of the frequency range, such as around 1,000 or 2,000 cycles per second. I have discovered that this over-emphasis can be avoided and the characteristics of the response controlled as desired by attaching the outer cone 9 to the small rigid high frequency element through the medium of a compliance device. This permits the response of each element to be accurately predetermined and combines their performance as desired.

There is a range of frequency in the neighborhood of 1,000 cycles per second, for instance, wherein the inner and the outer diaphragm elements, while falling off in audible emission both contribute toward sound radiation. The diaphragms can be designed so that in this range of transition the radiations from the two diaphragm elements complement each other and build up a total response substantially equal to that of each separate diaphragm element in its own range of full efficiency. This is shown graphically in Fig. 4, which is a typical graph of response plotted against a logarithmic scale of frequency. Curve A illustrates in somewhat idealized form the response of the outer cone 9, and curve B is a similar curve showing the response of the inner annulus 22. Curve C is the summation of curves A and B and indicates that the response may be maintained substantially uniform in the transition region where both response curves fall off.

If the inner annulus be made too large it will contribute too much response in this transition range which results in the above noted over-emphasis in an intermediate range.

An important effect of segregating the inner and outer vibratory elements by the compliance ring is that the development or over-emphasis of some harmonies and the cancellation of other harmonies, with reference to the original sound, is minimized. Such distortion effects would tend to be developed in the larger outer cone if it were allowed to be vibrated at high frequencies above about 1,000 cycles per second. Another very beneficial result is that the response at one frequency is not appreciably altered by the simultaneous presence of vibrations of another frequency. Such objectionable alteration of response is commonly experienced in prior known speakers. The effect of joining the larger outer cone through a compliance ring at a position close to the voice coil support or inner annulus may be succinctly stated to be a resultant definite control of the response characteristics to give any desired response curve from the lowest tones to 16,000 or even 20,000 cycles. There may be obtained a nearly ideal uniform response characteristic over a wide range of frequencies (about 30 to 16,000 cycles per second) in which peaks and dips in the response are minimized, and which is not subject to variation in the presence of a plurality of simultaneous frequencies.

Fig. 5 illustrates a modification of the diaphragm which may be substituted for that shown in Fig. 1. In this modification the inner wing of the inner diaphragm element 49, instead of terminating in a rigid flange, as at 26 in Fig. 1, extends completely across the center in the shape of a dome 50, and is particularly adapted when rising characteristics of the response curve are desired at higher frequencies or for smaller sizes of speakers where the extra area is a factor in giving the desired volume. Also the outer flange 25 of Fig. 1 is omitted in Fig. 5 although this feature may be incorporated if desired.

The paper cone 16 extends down to a point 51 which may conveniently be about 3/8 inch from the coil support 21. The reinforcing cloth layer 32, however, extends to the coil support and forms a flange ring at 52 which is cemented to the support. The annular strip of cloth at 53 forms the compliance ring between the coil support and the outer cone; the yielding of this ring is somewhat greater than that of the felt ring 35 of Fig. 1.

To determine the proper characteristics of a proposed compliance, which characteristics may, of course, be varied, to vary somewhat the relation between the high frequency element and the low frequency cone, it is only necessary to fasten the outside of the compliance ring and determine the frequency response of the attached inner high frequency element and then fasten the inside of the compliance ring stationary and determine the low frequency response of the outer cone element. These characteristic responses are substantially reproduced if precisely the same compliance ring is used between these parts connected to the same voice coil. The compliance ring in the apparatus of Fig. 1, for instance, is an annular felt ring about 1/8 inch square in section, the higher grade felts of longer more closely packed fibers being preferable.

A 12" diameter should be sufficient for most purposes for the low frequency cone, the plunger part being correspondingly less than 4" in diameter. The diameter of the smaller sizes is 6" or less for the cone with a closed-over plunger of a diameter of about 2" including the flange, the dome itself being not much greater than 1" and the diameter of the voice coil not much in excess of 1".

Owing to the extra area supplied by the dome 50, the response of the inner diaphragm element extends down to somewhat lower frequencies than if the dome were omitted; and because of the increased yielding of the compliance ring the upper frequency at which the outer cone is responsive is lower than in the arrangement of Fig. 1. Thus the proportions of the inner and outer elements may be regulated to provide an overall uniform response or any desired modification thereof.

As in Fig. 1 the location of the centering device 37 will be at a point away from the voice coil 27 allowing said coil to operate freely at the high frequency and so actuate the high frequency ring 24 without the inertia limitations imposed by ring 37 were it located adjacent to coil 27, but its being attached to cone 9 requires that it operate only at the low frequencies, where it has full control as far as keeping the voice coil 27 properly centered.

When a rising characteristic is desired at higher frequencies, these may be provided by increasing the effective emitting area of the annular center piece even to the point of completely doming this over as shown in Fig. 5. Increase of area of this center piece is preferably attained by increasing the area of the center flange toward a dome-like structure because this can be done with combined stiffness and lightness in comparison with the effects resulting from an increase in the area of the outwardly extending flanged portion. From mechanical and stress considerations, therefore, the inner flange or dome construction is to be preferred, but closely parallel performance in sound reproduction can be attained by a plunger structure having its annular emitting surface outside of the voice coil cylinder. In such a structure it is advantageous to have the outer periphery connected to the low frequency cone as explained for instance in connection with Fig. 9.

The response curve has a growing amplitude starting with hardly audible reproduction at 30 and increasing gradually at 40, 50, 60, and 70, at which point is has begun to round off to a substantially flat value at around 80. This low frequency curve will remain reasonably flat with small variation to about 800, and then will taper off in controlled manner to become inaudible at some point above 1,000, depending upon the pickup characteristics of the high frequency ring. The high frequency ring or plunger will not be audible to any substantial extent at the lower frequencies below 500, and will very gradually build up to around 700 or 800, where it will come in at somewhat the same rate as the low frequency cone is tapering off so that the sums of the responses of these two elements will remain very flat and very much the same, and above the point of disappearance of the low frequency reproduction the high frequency will remain substantially flat or have such other characteristics as are best adapted for cooperation with the particular system in which it is installed, the controls being predetermined in accordance with the preceding description.

Where as is rarely desired, the low frequency reproduction is to be somewhat suppressed, this can best be done by properly relating the area between the high frequency element and the low frequency cone reducing the area of the latter the desired amount.

Where the higher frequencies are to be accentuated the dome 50 may take on a more sharply conical form with the flange 49 enlarged to considerably greater area than the dome. The low frequency cone of a single layer for instance, could be attached by a softened portion or compliance ring to the periphery of the flange 49 and beyond the softened portion will be stiffened as by lacquering to give the desired low frequency characteristics. In such a construction the centering device 36 would preferably be connected to an intermediate part of the flange 49, a compliance ring of soft material being interposed between the device and the flange so as not to transmit the high coil vibrations to the centering means.

In another special type for rising characteristics at higher frequencies, a total plunger diameter of about 3" would be adaptable, including a substantially closed dome and an outward flange, this to be combined with a cone of a total diameter of about 8" actuating surface and being illustrated very closely by the construction shown in Fig. 6.

Fig. 6 shows another modification of the invention in which the inner vibratory element 49 is similar to that of Fig. 5. The outer vibratory element comprises the paper cone 16 covered by rubberized fabric 32 as in Fig. 1. This outer element is fastened at its inner periphery by cementing the fabric directly to the underside of wing 23 of the inner element. The thin sheet of rubberized fabric, then between wing 23 and the paper cone acts as the compliance ring.

The large area of the inner element makes it responsive down to a fairly low frequency as in the case of Fig. 5.

The central pole piece 10 is provided with an opening 60 extending axially therethrough to permit free flow of air to and from chamber 61 behind the dome 50. If opening 60 were not present, there would be a tendency for the vibrating diaphragm to force air past coil 27 in the annular air gap 13. Such a passage of air would produce an unpleasant hissing sound. The passageway 60 may be used with any of the other embodiments.

There is used with the device of Fig. 6 a centering arrangement which differs from that shown in Fig. 1. This centering means, shown in detail in Fig. 7, comprises a continuous loop of cord 62, such as a hard braided silk line, cemented at four places 63, 90° apart around the outer lower edge of the inverted V 33. Four cords 64 are tied to the loop 62 at the four points which are midway between the four cemented points 63. These cords 64 are fastened to individual centering screws 65 placed 90° apart around the periphery of the cone supporting spider. The cords 64 are pulled taut so that loop 62 takes the form of a square. By adjustment of screws 65 the current coil 27 and its cylindrical support 21 may be accurately centered within the annular air gap 13.

The cords 64 have sufficient flexibility to allow appreciable movement in the direction of the axis of support 21; but there is permitted practically no stretching of the cords, so that substantial concentricity is maintained between coil 27 and the air gap 13. While a set of four cords is shown in the centering device of Figs. 6 and 7, the principle of the centering action is not confined to this number but may be used in connection with three, five or more cords as desired.

Fig. 8 shows an enlarged detailed view of a modification of the compliance ring which may be substituted for that shown in Fig. 6. In Fig. 8 a ring 70 of a suitable compliance material is interposed between the fabric 32 of the outer vibrating element and the under side of wing 23. The use of this additional ring 70 introduces greater resiliency between the inner and outer vibratory element, which may be desirable in arriving at a proper response characteristic.

Fig. 9 illustrates another way in which compliance rings may be interposed between the inner and outer vibratory elements. In Fig. 9 the inner periphery of the outer vibratory element is cemented to a compliance ring 20 attached to the coil support 21, as in Fig. 1; and a second compliance ring 71 is cemented between the fabric 32 and the wing 23.

It should be understood that the invention is not limited to the specific arrangements shown, but is subject to a considerable range of modification. For example the diaphragm elements are susceptible of change in shape and material and the compliance member can be considerably varied as to shape and position. Either of the two centering devices might be used interchangeably in any of the embodiments; or if desired, some other form of centering device may be used.

Figs. 10 to 13 illustrate an electrodynamic speaker embodying the invention in which the outer diaphragm element is flat instead of conical. In this embodiment the actuating coil 75, of small size and light weight, preferably made of fine aluminum wires and provided with highly flexible terminal lead-in wires, is wound in a single layer over the sheet mica cylinder 76, which may be reduced to a thinness of .0015 inch and still be very stiff and substantially non-compressible. It will be appreciated that this coil must be not only of extremely light weight but that its connection to the vibratile member must also be of extremely light weight so that it will have as little inertia as possible; and its connection must be rigid so that there will be no absorption or distortion of its movements. When a sheet of the order of thinness of the mica is formed into a cylinder the resulting cylinder may easily have a maximum wall thickness of substantially .0015 inch. It is possible to have substantially all of the wall portion approximately .0015 inch in thickness by abutting the edges of the cylindrically wound sheet and holding the cylinder in position by the surrounding coil which is preferably cemented in place. Although the sheet may have a thickness somewhat greater than .0015 inch, it should preferably be not greater than .004 inch. Mica is eminently suitable for the purpose because of the high ratio of stiffness to weight of this crystalline substance. The cylinder 76 is suitably attached, as by cement, to an inner diaphragm element, designated in its entirety as 77.

Figure 12:
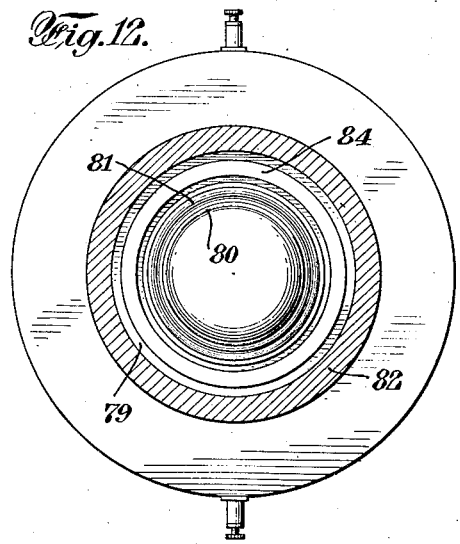
Fig. 12 is a transverse sectional view of the device shown in Fig. 10.
Figure 13:
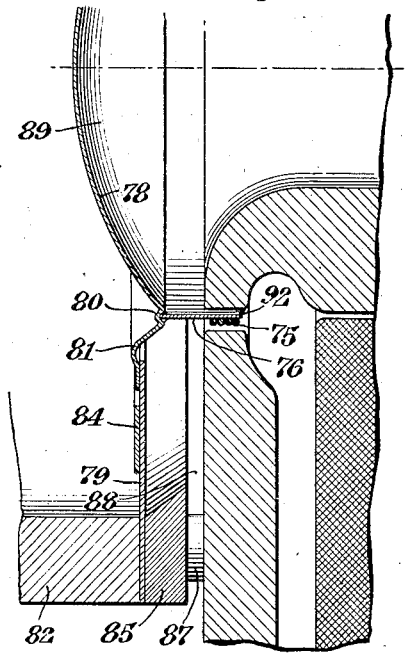
Fig. 13 is an enlarged fragmentary view of parts shown in Fig. 12.

The inner diaphragm element 77 comprises in general two elements, a circular inner plunger element 78 and an outer concentric ring element 79 (Figs. 10, 12, and 13). The inner plunger element is made of a light and rigid material which may be molded or pressed of plastic material into the desired shape. Aluminum of .002 inch thickness gives satisfactory results. The plunger part 78 has a central area stiffened by the particular formation of its wall or shell, which is preferably arched in a convex or in a concav-o-convex shape as in Fig. 14 or dome-shaped as in Figs. 10 to 13; and in the present embodiment the dome or arch follows the arc of a perfect circle. At the outer edge or base of the dome is a rigid annular region comprising a groove 80 formed by an inverted V to which the edge of the mica cylinder 76 carrying the voice coil is attached. From the groove 80 a skirt 81 extends upwardly and outwardly forming an arched portion along a curved path and then extends outwardly in a substantially flat marginal flange. The skirt 81 is arched this way to obtain as much rigidity as possible, which permits but a minimum of circular vibrating nodes to exist. If instead the skirt 81 were extended upward and outward in a straight line forming the usual cone shape, a thicker material would be necessary in order to retain the required rigidity; and the thicker material, being heavier, would introduce inertia problems, etc. It follows that since the marginal flange of skirt 81 is the only area of the plunger part 78 which is not arched or curved, it is the most flexible area of part 78. The outer ring element 79 is integrally attached to the flat marginal flange of skirt 81 as by cement. The ring 79 and the marginal flange of skirt 81 thus constitute an annular marginal area forming an integral part of the diaphragm. The area of the ring 79 should be at least 50% of the area of the plunger part 78, and is preferably equal to or greater than the area of the plunger.

From the foregoing it will be understood that the vibrations of the voice coil 75 are transmitted without alteration through the substantially noncompressible cylinder 76 to the highly stiffened region at groove 80. At the highest frequencies, the whole area of the plunger element 78 does not vibrate in such a manner as to produce sound; but instead only the region 80 is in vibration, the central or dome-shaped area and the outer skirt 81 remaining practically stationary. Under this condition the stiff coil support 76 and the stiff diaphragm portion 80 rigidly cemented thereto vibrate in unison without distortion or absorption of the vibrations. But when the frequency becomes lower the area in vibration extends in both directions from the extremely rigid region 80, and more and more of the central area and of the skirt are brought into vibration. This is a great inherent benefit because the active vibrating area necessary for a constant amplitude on the human ear is substantially inversely proportional to the frequency in cycles per second.

To prevent the middle range of frequencies (about 1,000 to 3,500 cycles per second) from being over-accentuated relative to the somewhat higher frequencies, it is necessary to keep the diameter of the inner plunger part 78 very small. It has been found, for example, that in the form of the invention illustrated, the overall diameter of the plunger 78 should not be greater than about 5 inches. The vibrating area varies also with the change of volume at a given frequency. It is, therefore, desirable for this additional reason to keep the diameter of the plunger 78 relatively small so that the middle range of frequencies may be reproduced at an amplitude that is in proper relation to the higher frequencies.

From the foregoing it will be understood that in the reproduction of frequencies from approximately 1,000 cycles per second downward, the element 77 functions as a plunger moving back and forth uniformly, and herein the physical factors of mass and tension are to be more especially considered.

The lower the frequency the greater is the amount of air that must be displaced to make the sound equal in amplitude to that at the high frequencies. As heretofore stated, the plunger 78 is small and in order to displace the required amount of air, it is joined to a suitable horn such as 82, the opening of which joins to a horn opening in a cabinet or container 83, such as might be used in housing the complete loud speaker. The expanding column of air within the horn 82 allows the plunger to get a grip on the air at low frequencies. For the plunger properly to follow the physical motion of the electrical pulsations at the low frequencies, it must be so mounted as to be perfectly free to move back and forth the necessary distance and velocity required by the amplitude of the electrical impulses necessary for the average room volume of home radio for which the speaker illustrated is particularly well suited. Because of the extreme lightness of the plunger 78 herein described, it has an extremely low moment of inertia and low momentum, making it more responsive to the transient impulses such as the plucking of strings, impact sound, drums, etc.

With such requirements, it is desirable to produce an extremely flexible and light mounting or support for the plunger element 78, and furthermore, such mounting should be resonant at frequencies in the neighborhood of 50 cycles (and not substantially greater than the order of 200 cycles), the point of resonance being quite broad. In addition to this, it is desirable that this mounting act as a part of the diaphragm member, which may be termed a plunger diaphragm of which the ring 79 is a part. The ring augments the displacement area of the diaphragm at the lower frequencies. This ring 79 heretofore described, is designed to perform these functions; it should be substantially air-impervious; otherwise the air upon being displaced would circulate from one side of the diaphragm to the other.

To describe materials suitable for the construction of the ring 79 the following are given as examples of satisfactory rings. It has been found that chamois in its commercial state is well suited for the purpose. It has also been found that light weight cotton, one side of which is napped and which is treated as follows is quite satisfactory. The napped condition helps to prevent the ring from resonating at any frequency other than extremely low frequencies. On the smooth side of the cotton cloth there is applied a suitable filler or coating such as a very thin application of rubber which may take the form of latex in solution. It will be understood that other materials may be found satisfactory, the chief characteristic desirable being that the material chosen be air-impervious, flexible and non-resonating, except as it may be made to resonate within a certain range of low frequencies in accordance with the desire of the designer. The range of frequencies within which the material is resonant may be selected by stretching it to the desired degree, since by such stretching its tightness or looseness becomes a factor in the mass and tension formula. It will be understood that by character such material is non-responsive at any frequencies unless stretched and mounted and arranged for the purpose in such a manner as is herein more fully pointed out, as, for example, where it is involved in joint action with the inner plunger element 77 at very low frequencies only.

At very low frequencies the ring 79 is utilized in the displacement of the air, for as mentioned heretofore, an increasing quantity of air must be displaced as the frequencies decrease. To assist in making the ring 79 more effective in the air displacement at low frequencies a flat relatively rigid ring 84 may be attached, as by cementing, at the central portion of the ring 79 (Fig. 13). This stiffened annular member 84 may be made of any thin light and relatively stiff material, such for example as cardboard. It will be understood that adjacent the inner and outer edges of the stiffened ring 84 the unstiffened portions of the ring 79 remain flexible.

The entire plunger diaphragm or vibratile member 77 heretofore described is supported in such a manner as by being cemented to the ring 85 which holds the same in place and which in turn is suitably secured, such as by screws or bolts, to the plate. In this manner the voice coil 75 is held within the air gap without rubbing against the faces of the annular air gap and is free to vibrate or oscillate back and forth in accordance with the electrical pulsations flowing through it.

Such a construction provides a combination of a dome (or arched) and a flat diaphragm which is ideally adapted for the greatest efficiency in operation. The inner plunger element 78 drives the air at the middle and high frequencies (the active sound producing area varying inversely as the frequency), and the entire diaphragm including the plunger element 77 and flexible ring element 79 with its stiffening member 84 drive the air at low frequencies.

In view of the extreme lightness of the inner plunger element 77 and of the voice coil and its attaching cylinder 76, any damping or loading influences its response very materially, especially at low frequencies. Such damping is provided for without interfering with the efficiency of operation of the device in the following manner. The diaphragm supporting ring 85 is spaced away from the pole plate 86 by spacing members 87 which are preferably held in place by the screws or bolts serving to attach the supporting ring 85. In this manner I provide for venting the chamber which will be designated as 88 and which is bounded on the upper side by the skirt 81 and the flexible ring 79, whose inner limit is defined by the wall of the cylindrical member 76, and whose lower wall is defined by the plate 86. The air from the chamber 88 is thereby permitted to escape through the vents provided by the spacers 87, and these vents have a predetermined area in cross section which will be defined more particularly hereinafter. It will also be noted that a chamber 89 lies beneath the central dome of the inner member 78 and the outer margin of such chamber is defined by the inner wall of the cylinder 76. The said chamber 89 communicates with the atmosphere, through the hole or bore 90 which is provided through the iron bowl 91. The following conditions and proportions with respect to the chambers and their respective venting means and the air pressure in the horn 82 during the operation of the device will now be particularly pointed out in order that this feature of the invention may be better understood and appreciated.

The cross section areas of the venting means between the spacers 87 and the cross section areas of the bore 90 are such as to bring about the predetermined degree of damping with respect to the operating pressure in the horn 82 as applied over the face of the plunger diaphragm 77, i. e., the extent of damping to a greater or less degree is provided by predetermining the cross sectional areas to a greater or less degree. On the other hand, if the operating pressures in the chambers 88 and 89 are substantially different, this will result in causing a flow of air around the lower end of the cylinder 76 within the air gap 92, thereby resulting in the production of extraneous sounds causing distortion of the sounds to be reproduced and otherwise presenting undesirable characteristics in operation. Accordingly, the respective cross sectional areas of the vent through the bore 90 to the chamber 89 and between the spacers 87 to the chamber 88 are so proportioned, with respect to the areas within the said chambers, as to produce substantially equal pressures of operation within the chambers 88 and 89. In this way an effective damping means is provided to any predetermined degree while at the same time there is avoided the movement of air around the lower end of the voice coil from the air gap 92.

Figure 14:
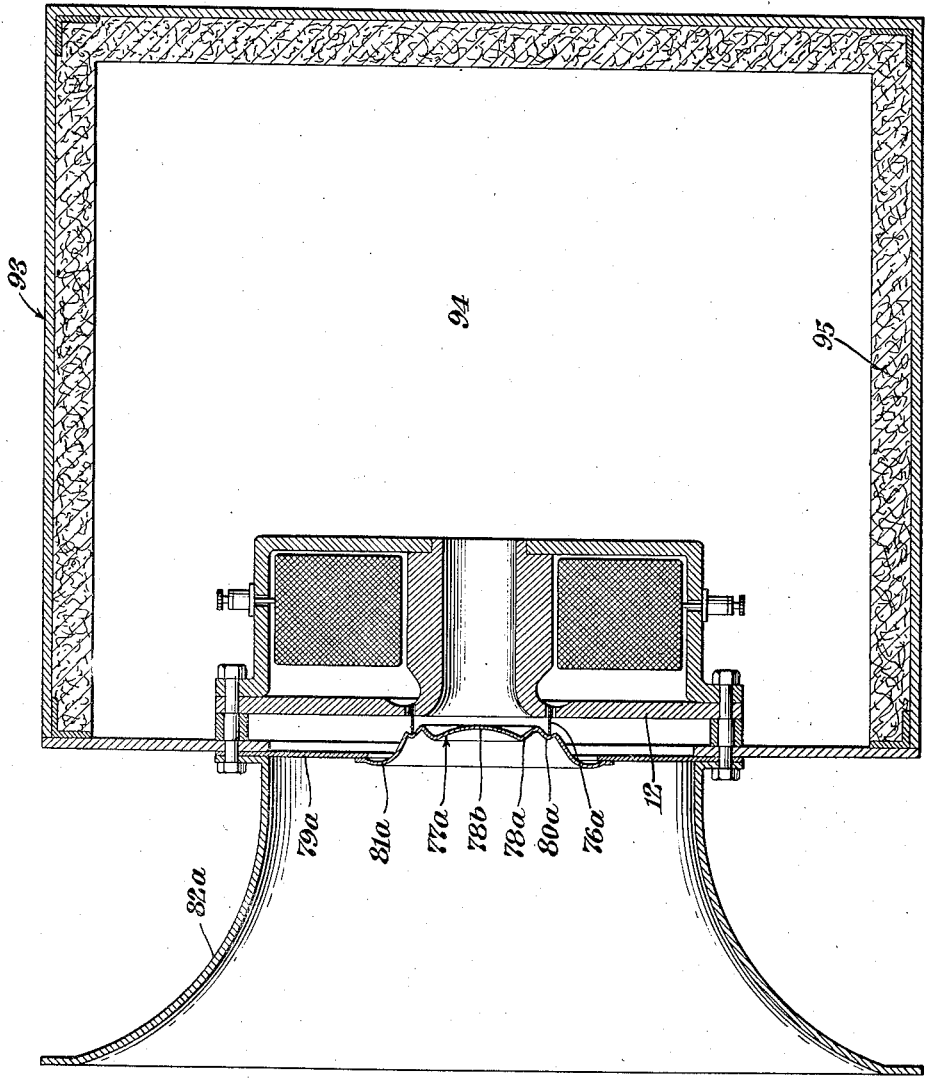
Fig. 14 is a sectional view of a modification.

Referring to Fig. 14, I have shown a modification which illustrates certain variations and other features of the invention, but which in many respects is similar to the device illustrated in Fig. 10. Similar parts of the device illustrated in Fig. 14 will be given corresponding numerals designating similar parts in Fig. 10, with a letter suffix added.

The diaphragm element 77a at its central area first rises outwardly from the annular region 80a as at 78a and then turns inward forming a concave center 78b, thereby providing a central area having a concav-o-convex configuration. This form of structure permits the use of a larger diameter voice coil cylinder 76a while still retaining the required degree of stiffness. It is also noted that the skirt portion 81a extends further upward and outward than in the embodiment illustrated in Fig. 10; also that the flexible ring 79a is given a larger radius. I have found that such construction permits using a shorter horn 82a, when combined with a special form of baffling which will be more particularly described hereinafter and which is still capable of producing the lower notes.

A substantially air-tight enclosure 93 constructed at the rear of the diaphragm acts as an infinite baffle which prevents the air waves which emanate from the areas 88a and 89a from circulating around to the other side (front side) of the diaphragm, regardless of frequency. Without this enclosure the ordinary type of flat baffle would be needed which has to be prohibitively large, if the low frequencies are to be made audible. If the directive baffle were used it would be necessary to lengthen the horn 82a to such a length as to make it impossible for use in the average home. The radius of the flat baffle would have to be equal to, or greater than, one fourth of the wave length of the lowest frequency to be reproduced.

With this new infinite baffle construction, described above, any frequency to which the diaphragm can respond will be radiated without loss through circulation of the wave from one side of the diaphragm around to the other side.

The area circumscribed by the sides of the enclosure 93 is bound to be resonant to some frequency, and the frequency at which it is resonant depends upon the dimension of the cavity 94 within the enclosure 93.

This natural law I put to use by making an infinite baffle box of predetermined cavity dimensions, the resonance of which is caused to be at some frequency that may happen to require reinforcement for proper diaphragm radiation.

The amplitude of the resonant point I control to the desired degree by the sound absorbing material 95. This material consists of any of the well known sound absorbent materials such as ozite material, cotton batting, etc., or the enclosure 93 may be made of a sound absorbing material such as celotex. Once the complete speaker is finished, it may be located in cabinets, etc., all of varying shapes and sizes without said cabinet influencing its tone fidelity.

Figure 15:
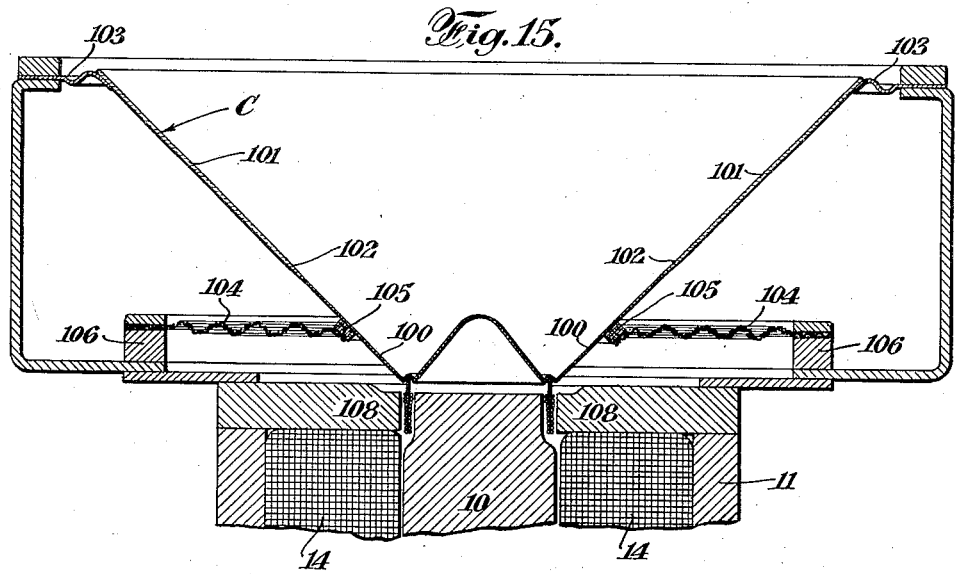
Fig. 15 is a sectional view of a modified form of diaphragm construction.

The cone C of Fig. 15 is formed as a single unit of deposited fibers continuous through the high frequency element 100, the low frequency element 101 and the intermediate compliance area 102. The high frequency element 101 is molded by depositing on a suction screen or perforated surface wood cellulose fibers from a watery slurry, the fibers being felted during the precipitation and accumulated to desired thickness of .005 to .02 inch. These fibers will be quite closely and snugly contacted; at the same time the outer portion of the cone forming the low frequency annulus 101 is similarly deposited of different material involving more fluffy fibrous material, such as wool fibers, cotton fibers or rayon fibers, either alone or in desired mixture. The fluffier fibers give a more open porous structure to the portion 101 and provide an inner surface of relatively sound absorbent character. Preferably, the cone is deposited on a gauze of generally conical shape and forming the inner emitting surface of the cone but the precipitation may be in an opposite direction wherein the gauze surfaces correspond to the lower surfaces of the structure shown in Fig. 15.

During the precipitation the outer portion 101 is separated from the inner portion 100, it being supplied with a different slurry, but in the region 102 corresponding to the built-in compliance these regions overlap one half an inch or less so that the different fibers are interlaced and felted into a continuous unitary formation.

After precipitation the cone may be pressed if desired and dried, and after drying is preferably stiffened by coating or impregnation of the high frequency cone portion 100 including the central dome, this impregnation giving the desired rigidity while at the same time maintaining the structural lightness. The low frequency cone portion 101 is preferably coated on its outside or lower surface throughout a portion thereof and down to near the compliance area 102, the degree of coating or impregnation being sufficient to give the desired flexibility while maintaining the surface desired sound emitting or sound aborbing characteristic.

The cone C is supported by the soft peripheral flange ring 103 at the outer edge and by the centering ring 104 engaging an intermediate point of the high frequency cone 100 by a compliance ring 105. The centering ring 104 is supported at its outer periphery on the ridge ring 106 and is preferably corrugated as shown at 107 to give it desired flexibility to follow the motions of the cone. This ring 104 is also made with air openings through it either by forming the ring of open net work structure, such as stiffened cheese cloth or gauze with free openings between the strands, or the ring may be formed of solid material punched with openings to relieve the air pressure in the space between the ring and the pole piece 108.

Figure 16:
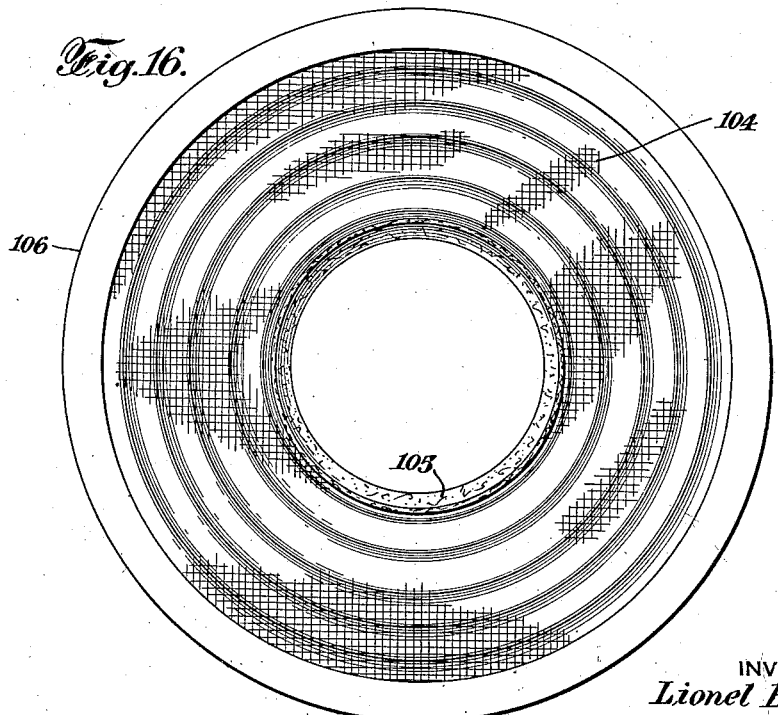
Fig. 16 is a plan view of a portion of Fig. 15.

The thickness of the low frequency material will generally be greater than that of the high frequency element and may be .035 inch or even thicker. While the cone C of Fig. 16 is described as being made by precipitation of fibrous material a similar cone may also be formed of fabric material of the closely woven cotton type, for instance, impregnated and molded to shape under heat and pressure and formed with the high frequency and low frequency elements stiffened to give the desired relative response characteristics and having between them a relatively soft area forming a compliance ring of the fabric itself. The front face of the low frequency element will preferably be napped to soft sound absorbing condition while the stiffening of this low frequency element is attained by coating with lacquer or like applied to the rear surface.

The invention is not confined to the specific embodiments shown and may be advantageously embodied in other constructions. For instance the outer portion of the conical diaphragm may be directed re-entrantly backward to give a flatter more compact assembly and various other modifications may be resorted to within the principle of the invention and within the scope of the appended claims.

This application is a continuation-in-part of my co-pending application Serial No. 678,832 filed July 3, 1933.

I claim:

1. In an acoustic device of the moving coil type, the combination with a vibratile member having a central plunger area, a flexible peripheral area and an intermediate rigid annular region, of a mica cylinder having a relatively thin wall and being rigidly attached to said annular region, and a voice coil carried by said mica cylinder.

2. In an acoustic device the combination with a vibratile member of means to vibrate said member comprising a mica cylinder whose wall consists of a sheet of mica of a thickness of not more than .004 inch, said cylinder being rigidly fastened to said member and having wound thereon a coil adapted to receive currents of an audible frequency.

3. In an acoustic device, a vibratile member having a rigid annular groove, a cylindrical coil support having its edge cemented in said groove, said form being composed of mica and a coil wound on and cemented to said form, and means for causing said coil to vibrate in response to currents of audible frequency passed through it, the coil vibrations being transmitted undiminished through said form to said member.

4. In an acoustic device, a diaphragm comprising a light central area, a relatively heavy flexible marginal area, a light intermediate area, more rigid than said central area, between said central and marginal areas, said intermediate area containing a grooved recess, a coil support of light noncompressible mica material cemented within said recess and a coil wound on said support.

5. In an acoustic device, a diaphragm comprising a light rigid central dome-shaped area, a relatively heavy flexible marginal area, a light annular intermediate area more rigid than said central area joined between said central and marginal areas, said intermediate area having an annular grooved recess, a magnet structure with pole pieces forming an annular air gap, a thin mica cylinder having a circular edge cemented into said recess and protruding back from said diaphragm into said annular air-gap between the pole faces of said magnet, a coil of wire wound on and fastened to said cylinder, means for centering said cylinder and the coil thereon within said air-gap, and means for applying to said coil current of an audible frequency to vibrate said diaphragm.

6. In an acoustic device, the combination with a vibratile member of means to vibrate said member comprising a thin mica cylinder rigidly secured to said member and a voice coil carried by said mica cylinder.

7. A combination according to claim 6 in which said mica cylinder has its surface superficially pressed with lines forming slight cracks parallel to the longitudinal axis of said cylinder to adapt the mica to cylindrical formation.

8. In an acoustic device, the combination of a diaphragm comprising a central area and an integral annular marginal area and an intermediate annular region, containing a peripherally grooved recess for reception of a voice coil support, said central area being relatively rigid, said intermediate region being more rigid and said annular marginal area being relatively flexible and substantially air-impervious and serving to support said diaphragm, a rigid and relatively light weight cylindrical member rigidly attached to and supported by said intermediate region, and a voice coil carried by said cylindrical member.

9. In an acoustic device, a vibratile member, a cylinder of thin mica interposed in a magnetic field, one edge of said cylinder being rigidly fastened to a stiff surface of said member, and a voice current coil wound on, and securely fastened to, said cylinder, whereby vibrations of said coil due to voice currents are conveyed to said member without any appreciable diminution or distortion.

10. In an acoustic device, a vibratile diaphragm having a rigid annular groove, a cylindrical coil support having its edge cemented in said groove, said form being composed of a material substantially as light and as non-compressible as mica and a coil wound on, and cemented to, said form, and means for causing said coil to vibrate in response to currents of audible frequency passed through it, the coil vibrations being transmitted undiminished through said form to said diaphragm.

11. In an acoustic device, the combination of a diaphragm comprising a raised central area, an annular marginal area and an intermediate annular area, said intermediate area containing an annular grooved recess for reception of a voice coil support, said central area being relatively rigid, said intermediate area being relatively more rigid and said marginal area being relatively flexible, a rigid and relatively light weight cylindrical voice coil support fastened in said recess, and a voice coil mounted on said support.

12. In an acoustic device, a plunger diaphragm having two converging annular surfaces, an inverted annular groove formed between said surfaces, a cylindrical voice coil support fastened in said groove, and means including said support for applying a driving force to said diaphragm uniformly around the vertex of said annular groove.

13. In an acoustic device, a voice coil structure comprising a rigid mica cylinder and a voice coil winding of a plurality of layers of wire, the edge of said cylinder being inserted between the last few turns of two of said layers, and the remaining turns of said layers being beyond the edges of said cylinder, said coil being held rigid by an impregnating material applied over the surface of said turns and then hardened to form the cylinder and voice coil into a rigid unit.

14. In an acoustic device, a diaphragm composed of an inner domed, arched or conical plunger portion and an outer curved, arched or conical annular portion, an intermediate connecting annulus between said portions formed as an inverted annular groove for reception of a voice coil support, and means including said support for applying a driving force to said diaphragm uniformly around the vertex of said annular groove.

15. In an acoustic device, a diaphragm comprising a relatively rigid central dome portion terminating at its periphery in an annular grooved recess for reception of a voice coil support, a rigid skirt surrounding said groove extending axially and radially outward in an arched portion terminating in a relatively flexible and substantially flat marginal flange.

16. In an acoustic device, a vibratile member comprising a central dome portion terminating at its periphery in an annular grooved recess for reception of a voice coil support, a rigid skirt surrounding said grooved recess extending radially and axially outward in an arched portion and terminating in a relatively flexible and substantially flat marginal flange, and a resilient substantially air-impervious ring forming an audible vibratory part of said vibratile member and serving as a supporting means therefor.

17. In an acoustic device, a diaphragm comprising a central area and an integral annular marginal area and an intermediate relatively rigid annular region, containing a peripherally grooved recess for reception of a voice coil support, said central area and said intermediate region and a portion of said annular area contiguous thereto being made in one piece of a light rigid material and the remaining portion of said annular marginal area being flexible and substantially air-impervious and audibly non-resonant to frequencies substantially greater than the order of 200 cycles.

18. In an acoustic device, a diaphragm comprising a central area and an integral annular marginal area and an intermediate relatively rigid annular region, containing a peripherally grooved recess for reception of a voice coil support, said central area and said intermediate region and a portion of said annular area contiguous thereto being made in one piece of a light rigid material, the remaining portion of said annular marginal area being flexible and substantially air-impervious and audibly non-resonant to frequencies of the middle and higher order, and said flexible marginal area having a stiffened annular central portion.

19. An acoustic device having a voice coil support and a piston diaphragm comprising two annular arched surfaces and an intermediate annular inverted groove for reception of said voice coil support, a coil to which motivating currents may be applied mounted on said support, said coil being attached to said diaphragm along the vertex of the inverted annular groove.

20. In an acoustic device, a diaphragm comprising a relatively rigid central dome portion having at its periphery an annular grooved recess for reception of a voice coil support, a very rigid annular skirt surrounding said grooved recess, and a relatively flexible marginal area fastened to said rigid skirt.

LIONEL B. CORNWELL.